United States Patent
Huang

(10) Patent No.: US 9,396,625 B2
(45) Date of Patent: Jul. 19, 2016

(54) ALARM CIRCUIT

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Yong-Zhao Huang, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 10 days.

(21) Appl. No.: 14/589,726

(22) Filed: Jan. 5, 2015

(65) Prior Publication Data

US 2016/0140814 A1    May 19, 2016

(30) Foreign Application Priority Data

Nov. 17, 2014  (CN) .......................... 2014 1 0651403

(51) Int. Cl.
*G08B 3/10*  (2006.01)

(52) U.S. Cl.
CPC ........................................ *G08B 3/10* (2013.01)

(58) Field of Classification Search
CPC ........................................................ G08B 3/10
USPC .................................................... 340/384.73
See application file for complete search history.

(56) References Cited

U.S. PATENT DOCUMENTS

| | | | |
|---|---|---|---|
| 2001/0017586 A1* | 8/2001 | Kojima | G08B 3/10 340/384.1 |
| 2006/0272704 A1* | 12/2006 | Fima | E03B 7/071 137/12 |
| 2007/0100572 A1* | 5/2007 | Zhang | G06F 3/162 702/103 |
| 2009/0323974 A1* | 12/2009 | Chang | H04R 29/00 381/59 |

* cited by examiner

*Primary Examiner* — Juan A Torres
(74) *Attorney, Agent, or Firm* — ScienBiziP, P.C.

(57) ABSTRACT

An alarm circuit includes an audio chip, a basic input and output system (BIOS), a platform controller hub (PCH), and a speaker unit. The audio chip is electrically coupled to the BIOS, the PCH, and the speaker unit. The audio chip receives control signals from the BIOS and the PCH, and controls the speaker unit to alarm according to the control signals.

3 Claims, 2 Drawing Sheets

ALARM CIRCUIT

FIELD

The present disclosure relates to alarm circuits.

BACKGROUND

Traditionally, a buzzer is mounted to the motherboard of a computer to warn of an abnormity of a computer.

BRIEF DESCRIPTION OF THE DRAWINGS

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

DETAILED DESCRIPTION

Figure 1:
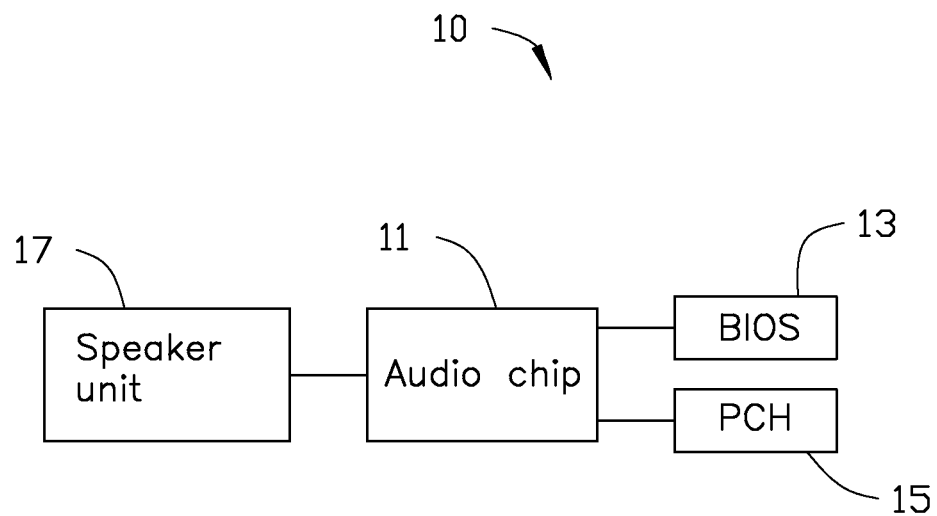
FIG. 1 is a block diagram of an example embodiment of an alarm circuit.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term coupled is defined as coupled, whether directly or indirectly through intervening components, and is not necessarily limited to physical connections. The connection can be such that the objects are permanently coupled or releasably coupled. The term comprising when utilized, means including, but not necessarily limited to; it specifically indicates open-ended inclusion or membership in the so-described combination, group, series and the like.

The present disclosure is described in relation to an alarm circuit on a motherboard.

FIG. 1 illustrates an example embodiment of an alarm circuit 10 on a motherboard. The alarm circuit 10 comprises an audio chip 11, a basic input and output system (BIOS) 13, a platform controller hub (PCH) 15, and a speaker unit 17. The audio chip 11 is electrically coupled to the BIOS 13, the PCH 15, and the speaker unit 17. The audio chip 11 receives control signals from the BIOS 13 and the PCH 15, and controls the speaker unit 17 to sound alarm according to the control signals.

Figure 2:
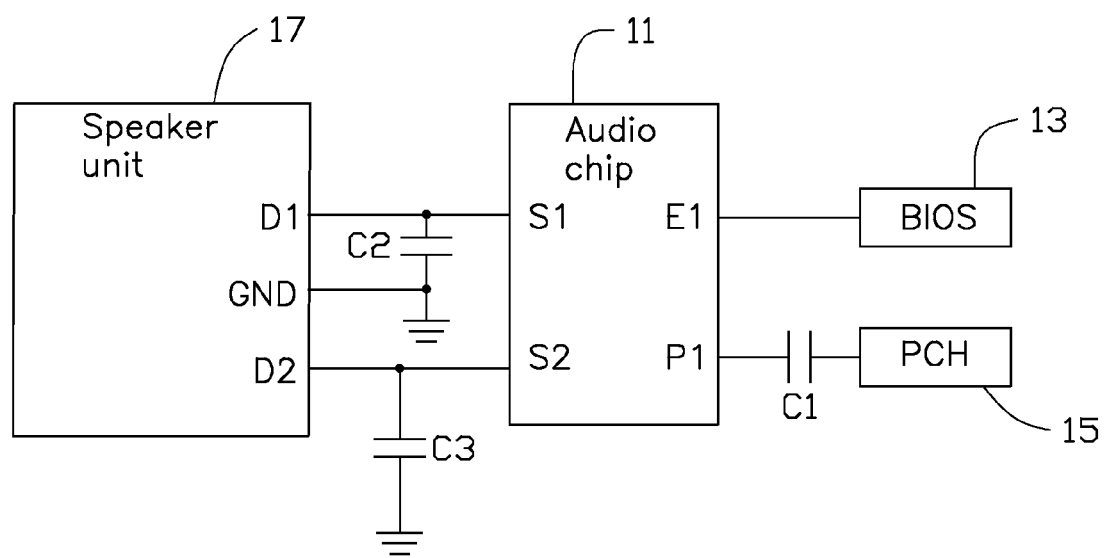
FIG. 2 is an example circuit diagram of the alarm circuit of FIG. 1.

FIG. 2 shows an example embodiment of the alarm circuit 10. The audio chip 11 comprises an input pin P1, an enable pin E1, a first output pin S1, and a second output pin S2. The enable pin E1 is coupled to the PCH 15 through a capacitor C1. The enable pin E1 is coupled to the BIOS 13.

The speaker unit 17 comprises a first data pin D1, a second data pin D2, and a ground pin GND. The first data pin D1 is coupled to the first output pin S1 and coupled to a ground through a capacitor C2. The second data pin D2 is coupled to the second output pin S2 and coupled to the ground through a capacitor C3. The ground pin GND is grounded.

In use, after a computer is powered on, the enable pin E1 receives a logic high level signal, and the audio chip 11 functions. If the computer works abnormally, the PCH 15 sends a logic high level signal to the input pin P1 of the audio chip 11, the output pin S1 and the output pin S2 of the audio chip 11 send a signal to the first data pin D1 and the second data pin D2 respectively, and the speaker unit 17 thereby sounds alarm. If the computer works normally, the enable pin E1 also receives a logic high level signal and the audio chip 11 functions, but no logic high level signal is sent to the audio chip 11 by the PCH 15, and the speaker unit 17 can play multimedia sound normally.

The audio chip 11 receives the control signals from the BIOS 13 and the PCH 15, and controls the speaker unit 17 to sound alarm according to the control signals. Thus, there is no need to equip the motherboard with a buzzer, and the available layout space of the motherboard is increased.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. An alarm circuit comprising:
    a platform controller hub configured to send a first control signal when a computer works abnormally;
    a basic input and output system configured to send a second control signal;
    an audio chip comprising an input pin coupled to the platform controller hub, an enable pin coupled to the basic input and output system, a first output pin, and a second output pin; and
    a speaker unit comprising a first data pin coupled to the first output pin, and a second data pin coupled to the second output pin;
    wherein the audio chip is configured to receive the second control signal from the basic input and output system and the audio chip works, the audio chip is further configured to receive the first control signal from the platform controller hub and control the speaker unit to emit an audio alert in accordance with the control signals.

2. The alarm circuit of claim 1, wherein the input pin is coupled to the platform controller hub through a first capacitor.

3. The alarm circuit of claim 1, wherein the speaker unit further comprises a ground pin, the ground pin is grounded, the first output pin is grounded through a second capacitor, and the second output pin is grounded through a third capacitor.

* * * * *